Dec. 10, 1957  O. B. DAVENPORT  2,815,726
DRAIN TILE LAYING DEVICE
Filed Dec. 20, 1955  2 Sheets-Sheet 1

Omen B. Davenport
INVENTOR.

BY
Attorneys

Dec. 10, 1957     O. B. DAVENPORT     2,815,726
DRAIN TILE LAYING DEVICE
Filed Dec. 20, 1955     2 Sheets-Sheet 2
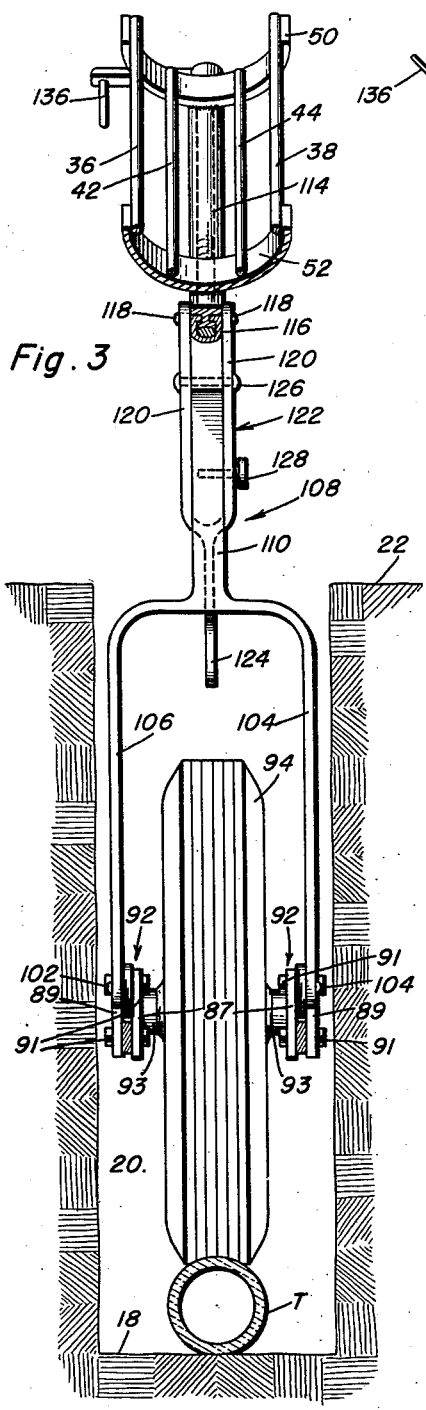
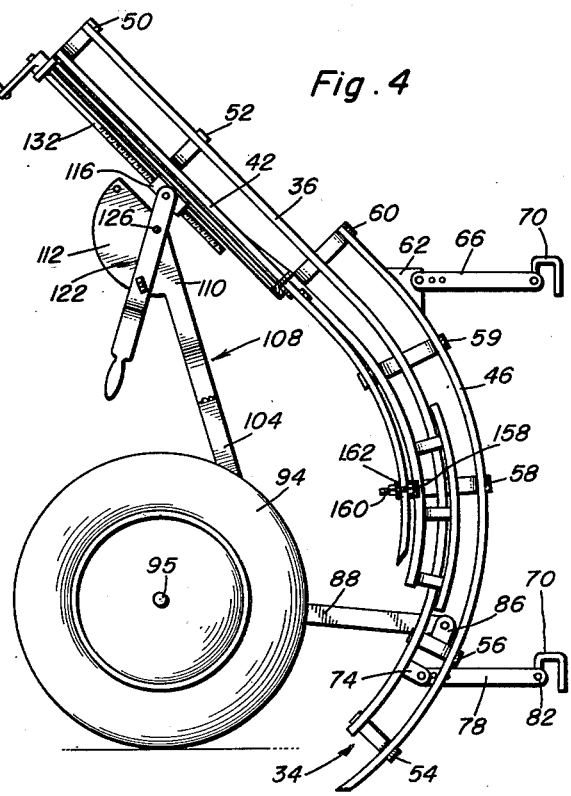
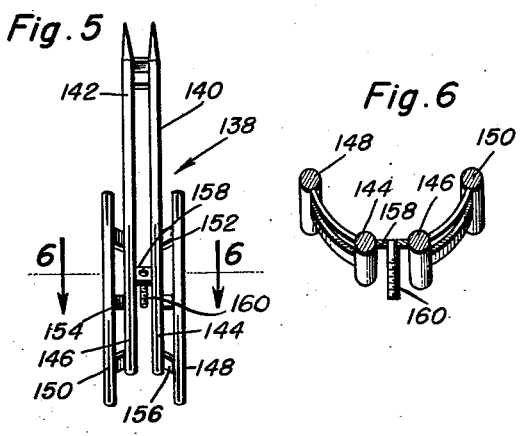
Omen B. Davenport
INVENTOR.

United States Patent Office 2,815,726
Patented Dec. 10, 1957

2,815,726

DRAIN TILE LAYING DEVICE

Omen B. Davenport, Wapakoneta, Ohio

Application December 20, 1955, Serial No. 554,286

3 Claims. (Cl. 111—5)

This invention relates generally to drainage ditch machinery, and is more particularly concerned with a device for automatically laying drainage tile in a drainage ditch.

A primary object of the invention is to provide a tile conveying chute including a forwardly inclined upper straight section into which tile are placed and a lower curved section having a discharge end directed in a direction opposite to that which the upper section is inclined, the conveying chute being pivotally supported about a horizontal pivot axis to draft means and including a packing wheel assembly supported in trailing relationship to said chute for engagement with drainage tile as they are gravity dispensed from the lower curved section thereof.

A further object of the invention in conformance with that set forth above is to provide in a tile conveying chute of the character set forth, means for adjusting the relative position between the discharge end of the tile conveying chute and the axis of rotation of a packing wheel of the packing wheel assembly whereby the relative distance between tile being laid may be determined.

A still further object of the invention in conformance with that set forth above is to provide means incorporated in the tile conveying chute which accommodates said tile conveying chute for laying tile of varying diameters.

A still further object of the invention in conformance with that set forth above is to provide a tile conveying chute of the character set forth which is readily and economically manufactured, easily installed and used, and highly efficient and practical for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged sectional view taken substantially on the line 3—3 of Figure 1;

Figure 4 is a side elevational view similar to Figure 1 with portions broken away, showing an insert attachment on the device for accommodating tile of a smaller diameter tile;

Figure 5 is a perspective view of the insert attachment removed from the tile conveying chute;

Figure 6 is an enlarged sectional view taken substantially on the line 6—6 of Figure 5.

Figure 1:
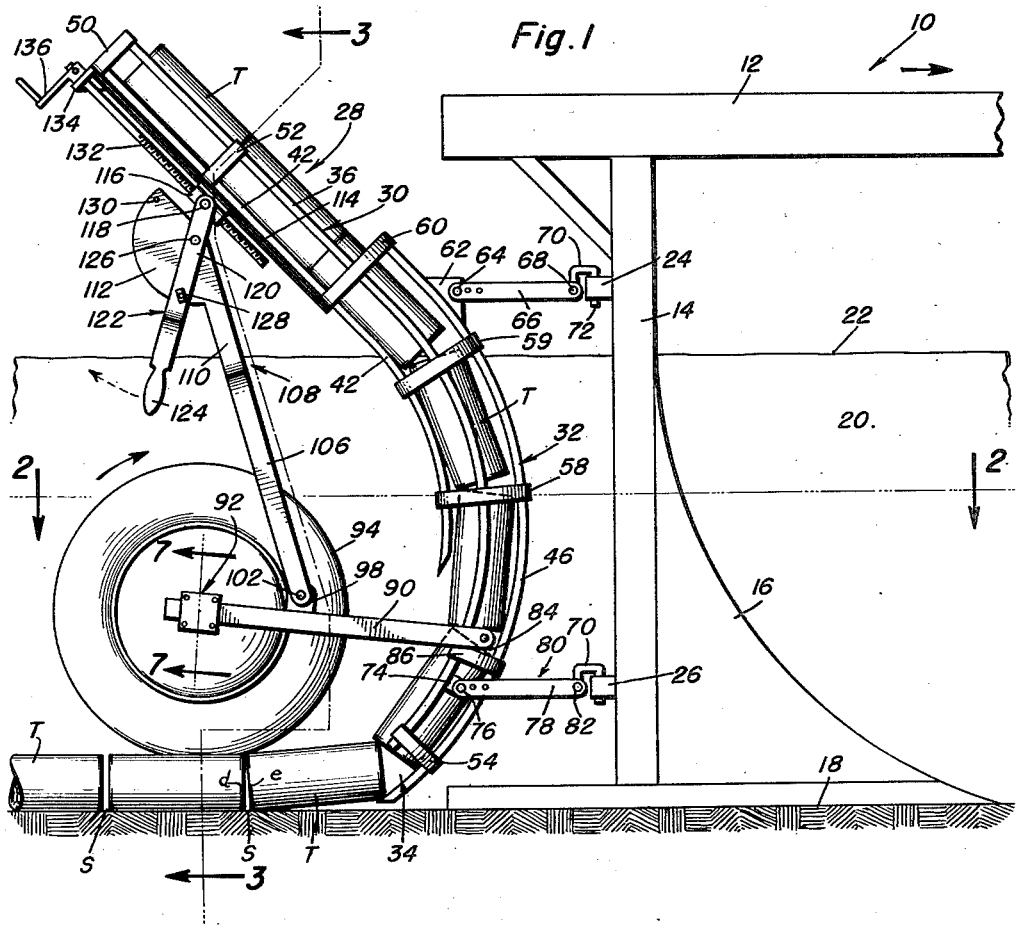
Figure 1 is a side elevational view of the novel tile conveying chute in position relative to a fragmentary portion of a ditcher.

Indicated generally at 10 is a fragmentary portion of the frame of a conventional ditcher which includes a horizontal frame member 12 suitably secured to a vertical frame member 14 supporting a trench dressing shoe 16. Said trench dressing shoe being engageable with the lower surface portion or bottom 18 of a trench or ditch 20, the ground level being indicated at 22. The vertical support member 14 includes a pair of vertically spaced support elements 24 and 26 having vertically aligned bore portions therein for a purpose to become subsequently apparent.

The novel tile conveying chute is indicated generally at 28 and includes an upper straight first section indicated at 30 which is inclined forwardly and downwardly toward the bottom of the ditch, the upper section terminating in a lower curved second section 32 having a discharge end 34 extending in an opposite direction from the inclination of the upper section 30.

The chute sections 30 and 32 are formed from suitable elongated rod elements including middle rods 36 and 38 which extend the entire length of the tile conveying chute, the lower rods for the upper chute section indicated at 42 and 44, and upper rods for the lower chute section are indicated at 46 and 48. The upper conveying section which includes the rods 36, 38, 42 and 44 have secured thereto in any suitable manner, for example by means of welding, a pair of longitudinally spaced semi-circular arcuate elements 50 and 52 which open upwardly, and the lower chute section defined by the rod portions 36, 38, 46 and 48 has secured thereto in longitudinally spaced relationship similar semi-circular arcuate elements 54 and 56. Circular support elements 58, 59 and 60 are suitably secured to all of the chute forming rods as most clearly seen in Figure 1 wherein said rods have overlapping end portions defining a central skeletonized tubular portion terminating in a lower discharge trough portion, the upper chute having an upwardly opening trough portion upon which the tile indicated at T will be disposed or placed, the tile being dispensed by means of gravity into the position shown in Figure 1.

A support element 62 is suitably secured between the rod elements 46 and 48 and includes therethrough a pivot pin element 64 adjustably positioned in a connecting link 66 which is pivotally connected at a pivot pin 68 to a bracket element 70 having a depending end portion 72 extendable through a vertical bore portion of the securing bracket 24. Extending from the rod portions 36 and 38 between the elements 54 and 56 is a connecting ear element 74 which is pivotally connected by means of a pivot pin 76 to one of the bifurcated legs 78 of a connecting element or link member indicated generally at 80, said leg 78 being connected to a suitable pivot pin 82 which is pivotally connected to a bracket element 70 of the character previously set forth.

Figure 2:
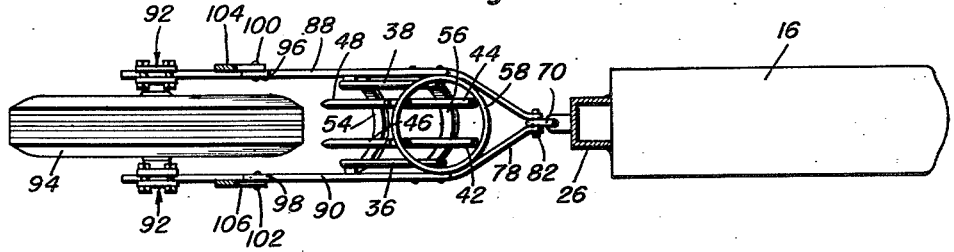
Figure 2 is a sectional view taken substantially on the line 2—2 of Figure 1.
Figure 7:
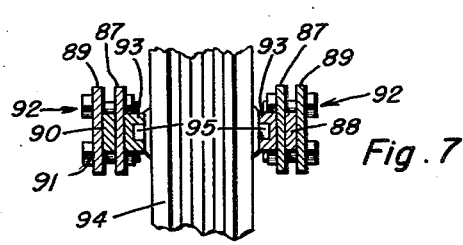
Figure 7 is an enlarged fragmentary view taken substantially on the line 7—7 of Figure 1.

Pivotally secured to suitable upwardly extending connecting ear portions 84 and 86 on the lower chute section 32 adjacent its discharge end 34 are horizontally pivotal support levers 88 and 90 which are pivotally connected at their rear end portions, see Figure 2, to a transverse support axle assemblies 92 of a packing wheel 94. The support axle assemblies 92 comprise a pair of parallel clamp plates 87 and 89 including aligned apertured portions having extending transversely therethrough clamp bolt assemblies 91 extending above and below the upper and lower edge portions, respectively, of the support levers 88 and 90, see Figure 7. The inner plates 87 have integrally secured thereto a lateral socket element 93 extending over and journaling therein an end portion of the support axle 94 of the packing wheel 94. Thus by loosening the clamp bolt assemblies 91, the clamp plates 87 and 89 and accordingly the wheel 94 may be adjusted along the levers 88 and 90 for adjustment to compensate for different diameters and lengths of tile as will subsequently become apparent.

The support levers 88 and 90 have extending from an intermediate portion thereof connecting ears 96 and 98, respectively, which are connected by means of transverse connecting pin elements 100 and 102 to the respective legs 104 and 106 of a bifurcated lift lever 108, the legs 104 and 106 being connected to a central portion 110 terminating in an arcuate segment 112.

A strip or track element 114 is secured to the semicircular elements 50 and 52 forming the upper section of the conveying chute and have slidably mounted thereon a centrally threaded sleeve element 116, said sleeve element including suitable laterally extending trunnion portions to which are pivotally connected leg members 120 of a lift lever 122 which includes a handle portion 124. The upper end 110 of the lift lever 108 is pivotally connected by means of a suitable pivot element 126 to an intermediate portion of the lift lever 122, and rotation of the lift lever 122 in the direction indicated by the dotted arrow in Figure 1 results in raising the wheel 94 out of engagement with the tile T disposed therebetween in the ditch. One of the bifurcated legs 120 of the lift lever 122 may include a transverse lock pin 128 which may be inserted into the aperture 130 in the enlarged portion 122 of the lift lever for the purpose of retaining the wheel 94 in a raised position, for example, when tile are first being started to be laid in the ditch, and the lever may be secured in the downward position shown in Figure 1 for maintaining the proper position of the discharge end 34 of the conveying chute relative to the bottom of the ditch.

As previously mentioned the tubular element 116 is internally threaded and has extending therethrough an adjusting or feed screw 132 which is journaled in a suitable bracket element 134 extending downwardly from element 50 of the upper section of the conveying chute, said screw 132 including at its upper end a suitable crank element 136 which may be rotated for positioning tubular sleeve element 116 relative to the track 114 on the tile conveying chute. The adjustment of the sleeve element 116 on the screw 132 results in pivotally raising or lowering the entire chute 32 about the axis of rotation of the packing wheel 94 for spacing the discharge end 34 of said chute a greater or lesser distance from the bottom of the ditch 20 whereby to vary the spacing at $s$ between the tiles T on the ditch bottom 18.

This variation in spacing results because each tile T before it is completely discharged partly leaves the discharge end 34 of the chute 32 at a downward inclination with its leading end $e$ engaged with the bottom 18 of the ditch 20 and inclined vertically relative to the trailing end $d$ of the preceding tile, as shown in Figure 1, and then drops from said discharge end 34 onto said bottom 18, whereby it fulcrums on its leading end $e$ to completely space said end $e$ from the trailing end $d$ of the preceding tile T. By raising or lowering the chute 32 the angle of the leading end $e$ is varied before the tile drops from the discharge end 34, whereby when the tiles are completely discharged, spacing between the same is varied. The spacing of the discharge end 34 of the chute 32 from the bottom 18 of the ditch 20 also compensates for laying tile of different sizes at the required inclination before they completely leave the chute 32.

It is readily apparent that the previously mentioned adjustment by means of clamp plates 87 and 89 will also afford means for adjustment of the wheel with respect to the discharge end 34 of the chute. Further, in this regard, although not shown, a suitable crank and adjusting screw assembly may be incorporated on the levers 88 and 90 similar to the adjusting means for the sleeve 116.

As most clearly seen in Figures 4 through 6, there is shown an insert assembly 138 which includes an upper straight portion composed of rods 140 and 142 and a lower curved portion constituted by the lower ends 144 and 146 of the rods 140 and 142, respectively, and rod portions 148 and 150. The rods 140, 142, 148 and 150 are secured together by means of suitable arcuate transversely disposed support elements 152, 154 and 156 which are longitudinally spaced on said rod elements, and a transverse connecting plate 158 having a connecting stud 160 extending therefrom is suitably secured between the rod elements 140 and 142 as seen in Figure 5. A securing strap 162 will be disposed upon the connecting stud 160 and extendable over the rod elements 42 and 44 of the conveying chute and thus the insert chute may be secured within the central portion of the conveying chute for reducing the central diameter thereof and accommodating the chute for tile of a reduced diameter.

Thus there has been disclosed a novel conveying chute which accommodates for the spacing of the tile T when laid as well as providing packing means for setting the tile and properly positioning the same, the heretofore described device fully conforming with the objects of invention heretofore set forth.

Various positional directional terms such as "front," "rear," etc., are utilized here and have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a drain tile laying device, a gravity discharge chute for tile comprising a forwardly and downwardly inclined upper section, and a rearwardly curved lower section, upper and lower parallel links pivotally secured to said sections and pivotally attachable to a ditch forming draft means for vertical adjustment relative to the bottom of a ditch, a packing wheel in the rear of the lower section for riding the tile laid on said bottom and having an axle, a pair of support levers pivoted to and extending rearwardly from said lower section, means pivotally mounting said axle between said support levers for vertical swinging of said chute by said support levers to vertically adjust said chute relative to said bottom of a ditch, and means for swinging said support levers comprising a screw feed shaft on the bottom of the upper chute section, a slide feedable on said shaft, a hand lever pivoted to and depending from said slide, and a lift lever pivoted to an intermediate portion of said hand lever and to said support levers.

2. The combination of claim 1, said lift lever and hand lever having coacting locking devices thereon for locking each to the other.

3. The combination of claim 1, said means for pivotally mounting said axle comprising slides on said support levers and axle for adjusting said packing wheel along said support levers and relative to said chute to compensate for different sizes of title discharge from said chute.

References Cited in the file of this patent
UNITED STATES PATENTS

| 516,750 | Blaine | Mar. 20, 1894 |
| 895,439 | De Young | Aug. 11, 1908 |
| 1,337,184 | Adams | Apr. 20, 1920 |
| 2,693,869 | Tucker | Nov. 9, 1954 |

FOREIGN PATENTS

| 557,213 | Great Britain | Nov. 10, 1943 |
| 583,182 | Great Britain | Dec. 11, 1946 |